United States Patent [19]

Tabata

[11] 3,891,131

[45] June 24, 1975

[54] DIVER'S HARNESS FOR COMPRESSED AIR TANK

[76] Inventor: Kazuo Tabata, 1-3-17, Higashi, Komagata, Sumida-Ku, Tokyo, Japan

[22] Filed: Apr. 24, 1973

[21] Appl. No.: 353,935

[52] U.S. Cl. .......... 224/25 A; 24/73 LA; 24/206 R; 24/263 B; 61/70; 224/5 W
[51] Int. Cl. .................... A45f 3/10; B63c 11/02
[58] Field of Search .......... 24/73 LA, 263 B; 61/70, 61/71, 69; 224/5 W, 25 A; 248/27

[56] References Cited
UNITED STATES PATENTS

| | | | |
|---|---|---|---|
| 827,260 | 7/1906 | Nickles | 24/73 LA |
| 996,652 | 7/1911 | Laurian | 24/263 B |
| 1,678,544 | 7/1928 | Whitaker | 24/73 LA |
| 2,895,202 | 7/1959 | Imparato | 24/263 B |
| 3,174,664 | 3/1965 | Hue | 224/25 A X |
| 3,269,129 | 8/1966 | Zambrano | 61/70 |
| 3,765,628 | 10/1973 | Wilson | 248/27 |

Primary Examiner—Paul R. Gilliam
Assistant Examiner—David H. Corbin

[57] ABSTRACT

An adjustable diver's harness has a substantially flat elongated body having upper and lower portions with elongated slots therein to receive a support-type belt member. One end of a L-shaped connecting member is fixedly secured at approximately the medial point of the elongated body. One of the terminal ends of a C-shaped clamping member is rigidly attached to the other end of the fixed L-shaped connecting member and the other terminal end of the C-shaped clamping member is adjustably connected to one end of another L-shaped connecting member that is also fixedly secured to the medial body section. The enclosure formed by the adjustable C-shaped clamping member and the median body section selectively supports therein compressed air tanks of various sizes. In one form of the invention, there is provided a pivotally mounted lever that assists in releasing the clamping member from a locked or unlocked position.

1 Claim, 8 Drawing Figures

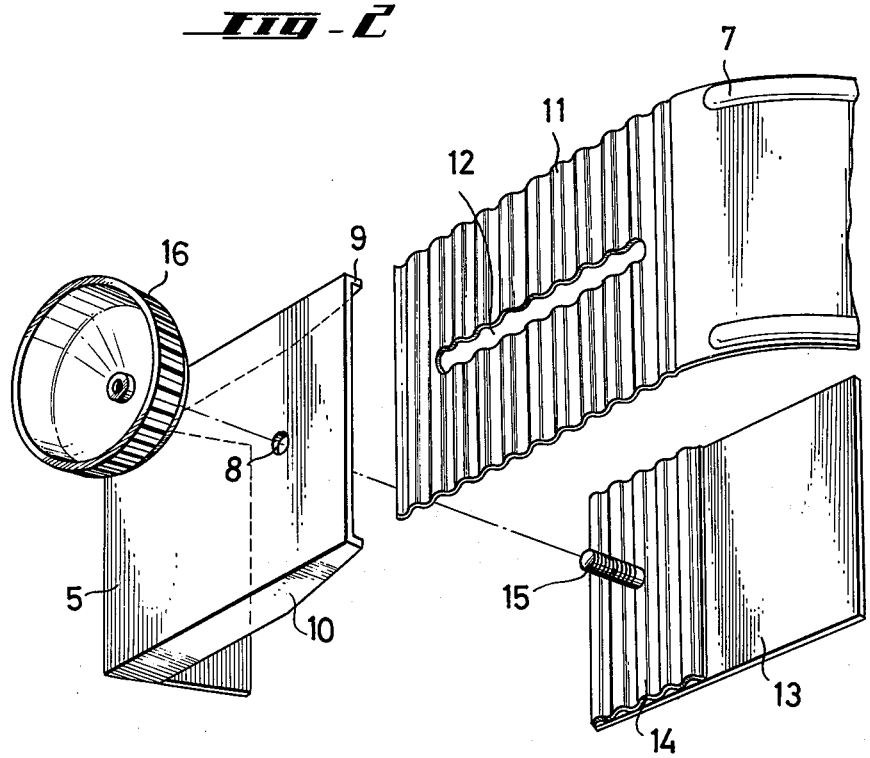
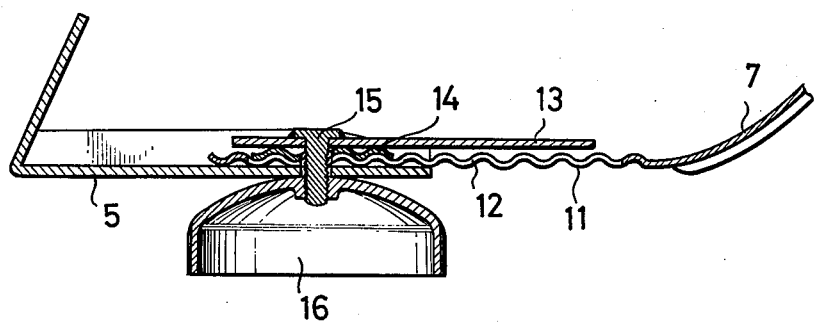

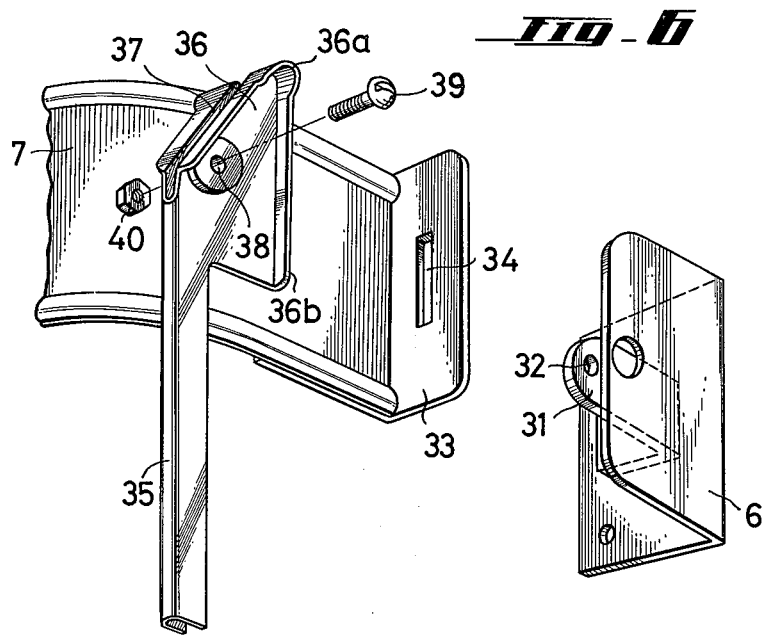
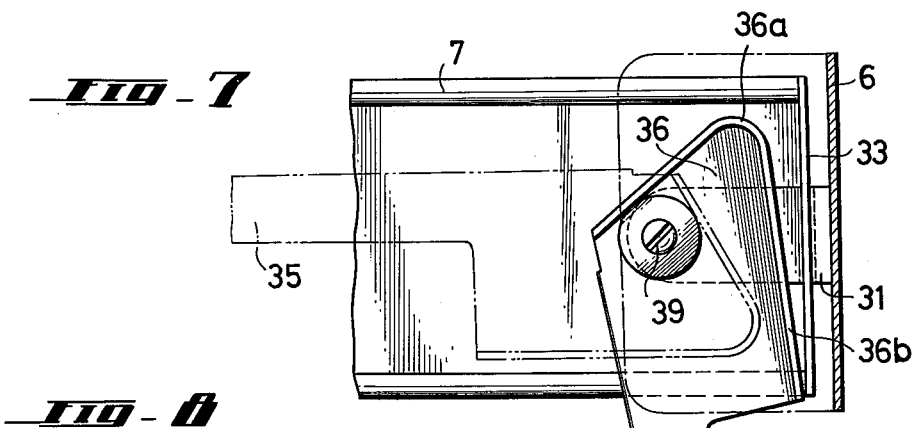
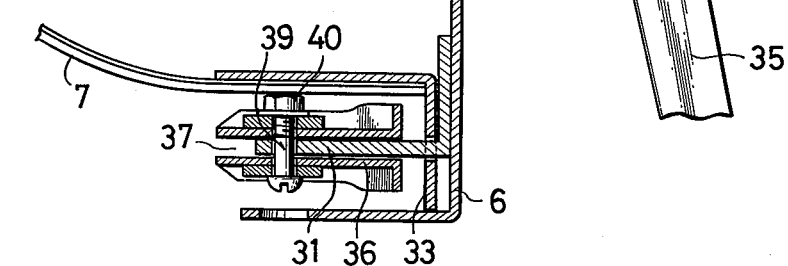

3,891,131

DIVER'S HARNESS FOR COMPRESSED AIR TANK

SUMMARY OF THE INVENTION

The present invention relates to a diver's harness for supporting a compressed air tank, and more particularly to an adjustable diver's harness for supporting compressed air tanks of various sizes. Such a tank is used when the diver dives into the water and carries it on his back.

In general, a harness of this kind comprises a plate-like body, a belt for the diver to carry the body on his back, and a belt like clamping unit for securing the tank to the body. Conventional harness is manufactured and sold as a set which includes a tank of a fixed size. Thus, the belt-like clamping member is not capable of holding tanks of various sizes. The harness has to be replaced depending on the size of the tank to be used. When the tank is to be attached or to be detached, a tool is required to clamp or loosen the clamping member.

An object of the present invention is to provide a harness which is constructed so that the length of the belt-like clamping member is adjustable and tanks of various sizes can be selectively held by virtue of the clamping member that can be clamped or loosened by a lever so that the attaching and detaching of the tank can be readily carried out in a simple manner.

More particularly, an object of the present invention is to provide an adjustable diver's harness for selectively supporting compressed air tanks of various sizes in a rigid manner within the harness. The harness is provided with a substantially flat elongated body having upper and lower portions with elongated slots therein to receive a conventional support-type belt member. One end of a L-shaped connecting member is fixedly secured at approximately the medial point of the elongated body. One of the terminal ends of a C-shaped clamping member is rigidly attached to the other end of the fixed L-shaped connecting member and the other terminal end of the C-shaped clamping member is adjustably connected to one end of another L-shaped connecting member that is also fixedly secured to the medial body section. The enclosure formed by the adjustable C-shaped clamping member and the median body section selectively supports therein compressed air tanks of various sizes. In one embodiment of the invention there is provided a pivotally mounted lever that assists in releasing the clamping member from its locked or unlocked position.

These and other objects of this invention are more clearly depicted in the following detailed description having specific reference to the attached drawings in which the embodiments of the invention are shown, not to limit the scope of the invention in any respect but so that the principles thereof might be more clearly demonstrated.

BRIEF DESCRIPTION OF DRAWINGS

FIG. 2 is a perspective view of an exploded showing of a connecting mechanism and one end portion of a clamping member of the harness;

FIG. 3 is a cross sectional top view of the coupled part of FIG. 2;

FIG. 6 is a perspective view of an exploded showing of a connecting mechanism and the other end portion of a clamping member which constitutes another embodiment;

FIG. 7 is a side view of a coupled part of FIG. 6; and

FIG. 8 is a cross sectional top view of FIG. 7.

DESCRIPTION OF THE PREFERRED EMBODIMENT

Figure 1:
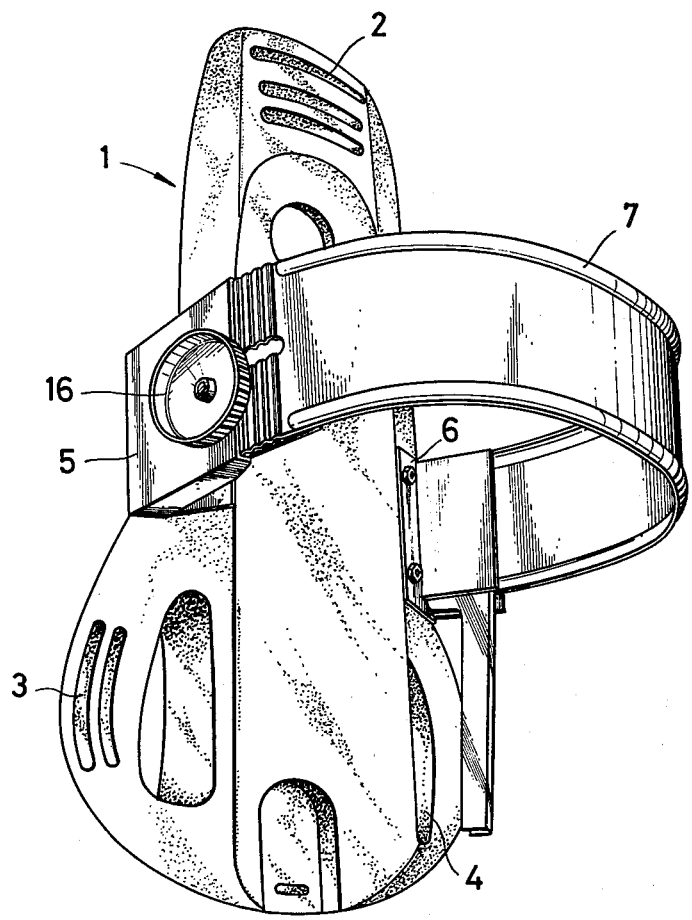
FIG. 1 is a perspective view of an entire harness of the present invention.

In FIG. 1, the harness body 1 is made of plastic, wood and the like and is constructed in a substantially flat structural form, and includes an upper portion and a lower portion. Both side portions of the lower portion are formed with a series of elongated holes 2, 3, 4 which are adpated to receive a conventional support-type belt member (not shown in the drawings) with which the diver can carry the harness body 1. The shape and structure of the body 1 are similar to those already known to the art. L-shaped connecting members 5, 6 are fixedly secured to both of the side portions at approximately the center of the body 1 by means of bolts and nuts. The outwardly extending ends of the members 5, 6 are coupled to each of the end portions of a belt-like C-shaped clamping member 7 which is made of metal and the like. The tank (not shown in the drawings) that contains the compressed air is arranged to be readily attached or detached from the body 1 by a clamping or loosening action of the member 7.

In FIGS. 2 and 3, the adjustable end L-shaped connecting member 5 that is secured to the body 1 is provided with a bolt hole 8 and includes upper and lower curved end inwardly extending flange portions 9, 10. Further, the clamping member 7 is provided with a corrugated surface 11 at its end portion and an elongated bolt hole 12 in the horizontal plane of the corrugated surface 11. The clamping member 7 is slidably inserted between the upper and lower flange portions 9, 10. A plate holding member 13 is provided with a corrugated surface 14 that is adapted to engage with the corrugated surface 11 whose shape is substantially identical with that of the surface 14. A bolt 15 is constructed on the holding member 13 and is inserted through both the bolt hole 8 and an elongated bolt hole 12. A cup-like nut 16 is screwed into the protruding end of the bolt 15. Accordingly, the enclosure formed by the body 1 and the C-shaped clamping member 7 can be suitably adjusted by loosening the nut 16 and shifting the extending portion, that is the corrugated surface 11 toward the connecting member 5 or shifting it in the opposite direction to separate it from the member 5. When it is rigidly clamped at the adjusting position by turning the nut 16, the corrugated surfaces 11, 14 are positively and mutually engaged, and even if the clamping member 7 is pulled toward the releasing direction with a certain amount of force, the engaged condition cannot be readily released.

Figure 4:
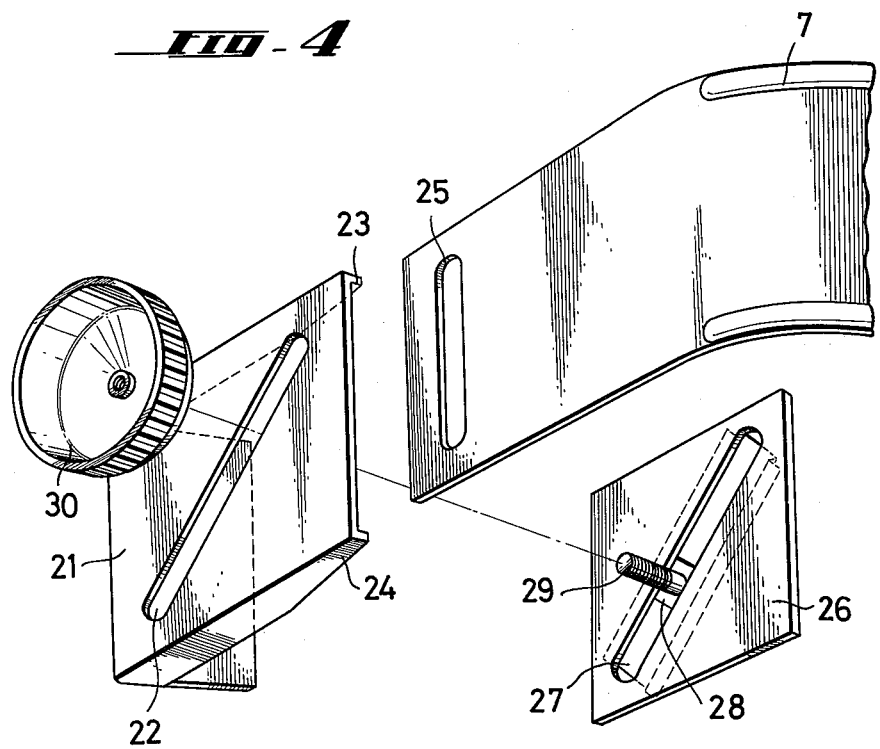
FIG. 4 is a perspective view of an exploded showing of the connecting mechanism and a clamping member which constitutes an embodiment different from the one shown in FIG. 2.
Figure 5:
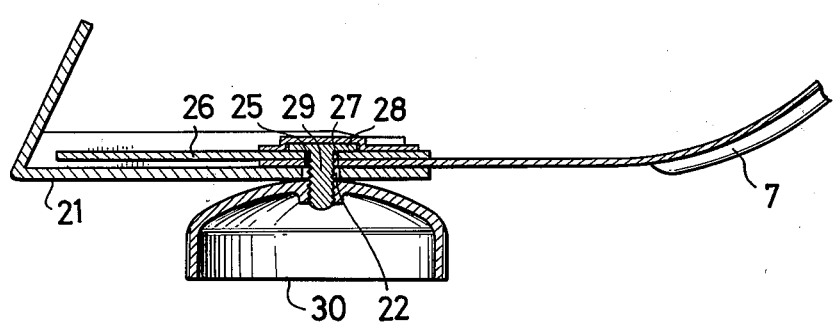
FIG. 5 is a cross sectional top view of a coupled part of FIG. 4.

In FIGS. 4 and 5, there is disclosed another embodiment which includes a structural arrangement which is slightly different from the foregoing connecting mechanism. The connecting member 21 is fixedly secured to the body 1, and is formed with an elongated inclined bolt hole 22 and includes upper and lower curved end inwardly extending flange portions 23, 24. Further, the clamping member 7 is formed with an elongated bolt hole 25 in the vertical direction at its end portion, and is slidable inserted between the upper and lower flange portions 23, 24.

In FIG. 6 through 8, there is disclosed another embodiment wherein the connecting member 6 that is fixedly secured to the body 1 is provided with a L-shaped supporting element or member 31 that is rigidly fixed to the connecting member 6 and that includes a bolt hole 32 at the free end thereof. Further, the clamping member 7 is provided with a rigidly secured L-shaped member 33 at its end portion, and a connecting elongated hole 34 in which the supporting member 31 is slidably inserted.

A pivotally mounted lever 35 having a base portion 36 is formed with a peripheral groove 37 to which the supporting member 31 is operatively inserted. A bolt 39 is inserted through both the bolt hole 32 and a bolt hole 38 of lever 35. A nut 40 is screwed into the protruding end of bolt 39 whereby the lever achieves its pivotal action. Also, the base portion 36 is provided with a peripheral circular arc shaped end face 36a which comes in slidable camming contact with the bent portion member 33 when the lever 35 is turned from a chained line position to a solid line position in FIG. 7. The movement of the lever 35 adjacent both the side of the supporting member 31, and an end face 36b prevent the member 33 from shifting in the direction where it is separated from the supporting member 31 when the lever 35 is turned. As will be obvious from FIG. 7 and the foregoing description, when the lever 35 is turned to the chained line position the clamping member 7 is shifted in the opposite direction and is thus separated from its connection with the supporting member 31. Therefore, the clamping action against the tank by the member 7 is released. Also when the lever 35 is turned to the solid line position, the clamping member 7 is shifted to the locked position of the connecting member and holds the tank through the clamping action of the member 7.

In this embodiment illustrated in FIG. 7, the end face 36b of the base portion 36 is formed rectilinearly, and accordingly, in order to press the member 33 against the supporting member side 31, the lever 35 is required to be pivoted in a right hand direction as shown in FIG. 7. However, in order to allow the member 33 to be urged against the side of the supporting member 31 by pivotally positioning the lever 35 perpendicularly, the end face 36b may be formed with a proper curved structure.

As will be apparent to persons skilled in the art, various modifications and adaptations of the structure above described will become readily apparent without departure from the spirit and scope of the invention, the scope of which is defined in the appended claims.

I claim:

1. A diver's harness comprising in combination:
    a substantially flat elongated vertically-oriented body having upper and lower portions, said upper and lower portions having a series of elongated holes therein which are adapted to receive a support-type belt member;
    first and second connecting members, each of said first and second connecting members having a shape of the letter L and the horizontal part of each of the letters L-shaped connecting members being fixedly secured at approximately the medial point of said elongated body and the vertical part of each of the letters L-shaped connecting members being outwardly extended from said elongated body;
    a C-shaped clamping member, one of the terminal ends of which being fixedly attached to said first L-shaped connecting member;
    slot and bolt means adjustably connecting the other said terminal end of said C-shaped clamping member to said second L-shaped connecting member whereby compressed air tanks of various sizes may be selectively accomodated within the enclosure formed by the C-shaped clamping member and the median section of the elongated body;
    said first L-shaped connecting member being provided with a supporting element; and
    a lever means mounted on said supporting element and pivoting about a fixed point adjacent to said first L-shaped connecting member to selectively assist in attaining locked and unlocked conditions between said C-shaped clamping member and said elongated body, said C-shaped clamping member including a bent portion positioned between said lever means and the horizontal parts of said first L-shaped connecting member, said lever means having a circular arc portion on one end and a handle portion on the other end, said circular arc portion having a groove on the periphery thereof, said peripheral groove making a sliding contact with said supporting element and circular arc portion making camming contact with said bent portion to attain said locked condition.

* * * * *